United States Patent Office 3,085,103
Patented Apr. 9, 1963

3,085,103
IRON ISONITRILE COMPLEXES
Walter Zygfried Heldt, Wilmington, Del., assignor to E. I. du Pont de Nemours and Company, Wilmington, Del., a corporation of Delaware
No Drawing. Filed Mar. 31, 1961, Ser. No. 99,666
18 Claims. (Cl. 260—439)

This invention relates to a novel process for the preparation of iron isonitrile complexes and to the novel complexes made thereby. More particularly, this invention relates to a process termed transalkylation whereby cyanopentaisonitrile iron (II) complexes are converted to different cyanopentaisonitrile iron (II) complexes by reaction with an alkylating agent.

Cyanopentaisonitrile iron (II) salts of the type $$(FeZ_5CN)_yX$$

wherein Z represents a substituted methylisonitrile ligand having at least one carbon-to-carbon multiple bond adjacent and singly bound to the alpha carbon atom; X denotes an anion; and "y" is an integer equal in magnitude to the valence of the anion, are described in copending application Serial No. 42,961, filed in the name of Walter Z. Heldt. These complexes are prepared by mixing at a temperature above about 50° C. either an alkali metal ferrocyanide or a tetrasubstituted ammonium ferrocyanide with an activated alkylating agent. The activated alkylating agent has the formula $R'_2R''CX'$ wherein each of the R' radicals is either hydrogen, lower alkyl (one to six carbon atoms) or aryl; wherein R'' is an activating group; and wherein X' is an anion selected from the group consisting of chloro, bromo and sulfonate groups. The activating group is a radical containing at least one carbon-to-carbon multiple bond, such as phenyl, vinyl, thienyl, furyl, ethynyl, naphthyl, and the like, and is bonded to the carbon of the alkylating agent through one of the multiple-bonded carbon atoms.

It has now been found that by employing the iron pentaisonitriles described in the above-referenced copending application as starting materials, other iron-pentaisonitrile complexes, especially those not obtainable, or obtainable only with difficulty, or in low yield by the alkylation of an alkali metal or tetrasubstituted ammonium ferrocyanide, may be obtained by a process herein termed transalkylation.

The products of this invention are generally defined by the following formula $$[Fe(RNC)_{5-y}(DNC)_yCN]E$$

wherein D is a radical selected from the group consisting of an alkyl radical and a substituted alkyl radical, E is an anion selected from the group consisting of bromide, chloride and iodide, R is a radical selected from the group consisting of alkyl and substituted alkyl and y is a number from 1–5 with the proviso that, when y is 5, D is a member selected from the group consisting of alkyl radicals containing at least six-chain carbon atoms and substituted alkyl radicals free of carbon-to-carbon unsaturation at the alpha position.

The process for obtaining substantially complete transalkylation and thus products of the general formula $$[Fe(DNC)_5CN]E$$

comprises interacting a cyanopentaisonitrile iron (II) salt with an alkylating agent of the formula

DE wherein D is a member selected from the group consisting of alkyl radicals containing at least six-chain carbon atoms and substituted alkyl radicals, other than methyl, free of carbon-to-carbon unsaturation at the alpha position, and substituted methyl radicals having carbon-to-carbon unsaturation at the alpha position, and E is an anion selected from the group consisting of bromide, chloride and iodide, at an elevated temperature.

The transalkylation may be caused to proceed to the extent that each of the original isonitrile ligands of the iron complex is transformed into the new isonitrile ligand, i.e., substantially complete transalkylation, as described above, and as indicated in the general equation (1)  $[Fe(RNC)_5CN]E + DE \rightarrow [Fe(DNC)_5CN]E + RE$ wherein D and E are as defined in the preceding paragraph and R is an alkyl or a substituted alkyl radical, or the transalkylation may be controlled so that only partial transformation occurs as in the equation (2)  $[Fe(RNC)_5CN]E + DE$
$\rightarrow [Fe(RNC)_{5-y}(DNC)_yCN]E + RE$ In the latter case, i.e., Equation 2, R is defined as being either alkyl or substituted alkyl and y is a number from 1–4. The process therein involved comprises transalkylating a cyanopentaisonitrile iron (II) salt with an alkylating agent of the formula

DE wherein D is a member selected from the group consisting of alkyl and substituted alkyl radicals and E is an anion selected from the group consisting of bromide, chloride and iodide, at an elevated temperature.

"Transalkylation," as used herein, is meant to describe the process in which an interchange of alkyl or substituted alkyl groups between the alkylating agent and the iron (II) complex occurs, and an equivalent amount of alkyl halide is eliminated.

The term "ligand" is used to designate functional or coordinate groups which have one or more pairs of electrons available for the formation of co-ordinate bonds.

The term "alkylating agent," as used herein, is meant to designate an agent which effects the substitution of an aliphatic hydrocarbon radical either totally or partially for an aliphatic hydrocarbon radical of the material with which it is being reacted.

The conditions of reactions employed to effect the transalkylation between the isonitrile iron (II) salt and the alkylating agent will vary depending upon the complex and the alkylating agent employed in the reaction. The temperature of the reaction usually is within the range of 80–200° C. and always, when applicable, sufficiently high to drive off the lower boiling halide quite rapidly. The temperature should also be below the point of decomposition of the reactants or the desired product. Lower temperatures employed in conjunction with sufficient vacuum to obtain ready distillation of the lower boiling halide are preferred. In the less preferred reaction, i.e., when the eliminated halide is not lower boiling and the reaction is driven by employing high concentrations of alkylating agent, temperatures within the range of 50–120° C. are usually employed. Reflux temperatures are preferred.

The amount of alkylating agent employed in the process is at least equimolar with respect to the isonitrile ligands to be transalkylated, and preferably it should be in excess. In the production of many transalkylated products, it is necessary to use an appreciable excess of alkylating agent especially when the halide eliminated in the course of the reaction is higher boiling than the alkylating agent employed. In this instance, as much as ten fold excess is employed whereas molar excesses of the order of 0.1 to 0.5 are utilized when the eliminated halide is lower boiling and may be removed from the reaction mass, as for example by distillation.

At the conclusion of the transalkylation reaction, it is desirable to remove any unreacted alkylating agent from the reaction mass and the products are isolated from the residues. Chromatographic techniques and fractional crystallizations are ordinarily employed in their purification.

Although alternative procedures may be employed, the techniques involving extraction and chromatography were chosen as the techniques most likely to lead to crystalline products. Details of the chomatographic procedure are as follows: Absorbent is prepared from 80–200 mesh activated alumina. The alumina is treated with an aqueous sulfuric acid solution until the pH if the supernatant liquor remains constant at 6.70–7.00. Liquid is then removed by filtration and the alumina is dried at 120–150° C. under 24 mm. of Hg pressure for 14 hours. A slurry of the dry material, usually in chloroform, is used in the chromatographic column. A weight of alumina ten to fifteen times the weight of the material to be chromatographed is found satisfactory. The samples are usually dissolved in chloroform, poured onto the column and eluted successively with solvents of increasing polarity; for instance, the series of solvents, chloroform, chloroform-acetone, acetone-methanol, and methanol. Eluate is collected in aliquot fractions. When it appears that the absorptive is no longer removed with the eluting solvent, elution is begun with that of the next order of polarity. When elution is complete, the aliquots are allowed to evaporate to dryness and the quantity eluted in each fraction is determined. By plotting quantity eluted versus fraction, a curve is obtained which indicates the separation of products effected, and therefore, the fractions to be combined for recrystallization.

Illustrative to the processes and products of this invention are the following examples in which the parts are given by weight, unless otherwise designated.

*Example I*

To 15.4 parts of cyanopentabenzylisonitrile iron (II) bromide is added 23.0 parts of p-methoxycarbonylbenzyl bromide. The reaction mixture is well mixed and then dry distilled under 4 mm. of Hg, the pot temperature being held between 95 and 120° C. During a period of 70 minutes, 8.5 parts of benzyl bromide is distilled. The brown oily residue (28.6 parts) is dissolved in chloroform and chromatographed on 500 parts of alumina suspended in chloroform. The column is washed successively with chloroform, a mixture of 50% by volume chloroform-acetone, acetone, a mixture of 50% by volume acetone-methanol and finally with methanol. Three compounds are eluted—the first (I) in the chloroform eluate, the second (II) in the acetone and acetone-methanol eluate, and the third (III) in the methanol eluate, and isolated by evaporation of the solvents.

The compounds II and III are combined and fractionally crystallized from methyl ethyl ketone. The less soluble fraction is recrystallized from chloroform-carbon tetrachloride and dried at 100° C. under 1 mm. of Hg pressure. The product is identified by analyses as cyanopenta(p-methoxycarbonylbenzylisonitrile) iron (II) bromide, $[Fe(pCH_3O_2CC_6H_4CH_2NC)_5CN]Br$. The infrared spectra of this compound and the hydrate prepared by the alkylation of potassium ferrocyanide employing p-methoxycarbonylbenzyl bromide are nearly identical. Upon reducing the volume of the mother liquor, a partially transalkylated product is obtained. Analyses are consistent with those calculated for cyanotri-(p-methoxycarbonylbenzylisonitrile)-dibenzylisonitrile iron (II) bromide. The compound melts at 141–142.5° C.

(I) *Analysis.*—Calc. for $$[Fe\text{-}(pCH_3O_2CC_6H_4CH_2NC)_5CN]Br$$

C, 59.03; H, 4.37; N, 8.10; Fe, 5.38; Br, 7.70. Found: C, 58.86; H, 4.68; N, 8.11; Fe, 5.74; Br, 8.01.

(II) *Analysis.*—Calc. for $$[Fe(pCH_3O_2CC_6H_4CH_2NC)_3(C_6H_5CH_2NC)_2CN]Br$$

C, 61.25; H, 4.48; N, 9.12; Fe, 6.06; Br, 8.67. Found: C, 61.09; H, 4.61; N, 8.93; Fe, 6.00; Br, 9.81.

Further reduction of the mother liquor, yields another partially transalkylated product. The analyses are consistent with those calculated for cyanotetra-(p-methoxycarbonylbenzylisonitrile)-benzylisonitrile iron (II) bromide. The hydrated compound melts at 123–126° C.

(III) *Analysis.*—Calc. for $$[Fe(pCH_3O_2CC_6H_4CH_2NC)_4(C_6H_5CH_2NC)CN]Br \cdot H_2O$$

C, 58.99; H, 4.55; N, 8.42; Fe, 5.60; Br, 8.01. Found: C, 58.79; H, 4.80; N, 8.95; Fe, 5.89; Br, 9.01.

*Example II*

To 15.5 parts of cyanopentabenzylisonitrile iron (II) bromide is added 18.00 parts of β-naphthylmethyl bromide. The reaction mixture is well-mixed and then dry-distilled at 2.0 mm. vacuum. A total of 13.1 parts of benzyl bromide is collected. The distillation residue is dissolved in chloroform and chromatographed on alumina employing in succession as eluting agents chloroform, a mixture of 50% chloroform-acetone by volume, acetone, a mixture of 50% by volume acetone-methanol, and finally methanol. Two distinct compounds are eluted, the first (I) with acetone, and the second (II) with the 50% acetone-methanol mixture. Compound (I) is recrystallized several times from wet methyl ethyl ketone, and found to melt over the range 165–167° C. Analyses are consistent with those calculated for cyanopenta-(β-naphthylmethylisonitrile) iron (II) bromide.

*Analysis.*—Calc. for $(β\text{-}C_{10}H_7CH_2NC)_5FeCNBr \cdot H_2O$: C, 72.12; H, 4.66; N, 8.26; Fe, 5.47; Br, 7.85. Found: C, 71.31; H, 4.85; N, 8.79; Fe, 5.92; Br, 7.98.

Compound (II) is recrystallized several times from methyl ethyl ketone and after drying at 100° C./1.0 mm. melts over the range 216–218.8° C. Analyses are consistent with those calculated for the partially transalkylated cyanodi - (β-naphthylmethylisonitrile)-tribenzylisonitrile iron (II) bromide.

*Analysis.*—Calc. for $$[Fe(β\text{-}C_{10}H_7CH_2NC)_2(C_6H_5CH_2NC)_3CN]Br:$$

C, 69.43; H, 4.64; N, 9.91; Fe, 6.59. Found: C, 69.58; H, 4.39; N, 9.76; Fe, 6.94.

*Example III*

To 23.0 parts of cyanopentabenzylisonitrile iron (II) bromide is added 73 parts p-dodecylbenzyl chloride and the reaction mixture is dry distilled under vacuum, with stirring. Distillate (19.7 parts) is collected and is found to contain benzyl bromide and benzyl chloride in about a one to twelve ratio.

The pot residue is dissolved in petroleum ether and chromatographed on neutral alumina suspended in petroleum ether. The column is washed with petroleum ether, whereby the fluorescent starting material is eluted. The washing is continued with a mixture of 50% by volume diethyl ether-petroleum ether and a yellow oil is eluted. Finally the column is washed with diethyl ether followed by acetone, and a dark oil is eluted.

The yellow oil is dried for about 50 hours at 1.0 mm. Hg. Analyses indicate its composition to be consistent with that expected for a mixture of the chloride and bromide salts of the cyanopenta - (p-dodecylbenzylisonitrile) iron (II) cation.

*Analysis.*—Calc. for $$[CH_3(CH_2)_{11}C_6H_4CH_2NC]_5FeCNBr(Cl):$$

C, 76.33; H, 9.83; N, 5.29. Found: C, 76.06; H, 9.40; N, 4.69.

*Example IV*

To 11.5 parts of cyanopentabenzylisonitrile iron (II) bromide is added 42 parts of 1-iodohexadecane and the reaction mixture is distilled at an oil bath temperature of 120–156° C. under .5 mm. Hg vacuum. After 98 minutes, there is distilled at 44–46° C. a yellowish liquid. The IR spectrum of the distillate indicates the presence of benzyl iodide and benzyl bromide only. Analysis of the distillate indicates 6.93% bromine and 47.18% iodine.

The reaction residue is boiled with chloroform and the solution is filtered hot. The chloroform soluble material is cooled to room temperature and is chromatographed on neutral alumina suspended in chloroform. The column is washed with chloroform, a mixture of 50% by volume chloroform-acetone, acetone, a mixture of 50% by volume acetone-methanol and methanol. Three fractions are eluted; the first (I), 34 parts, a liquid, with chloroform and 50% chloroform-acetone; the second (II), 7.3 parts, a solid, with acetone and the third (III); 6.6 parts with 50% methanol-acetone and methanol. Fraction I consisting mainly of hexadecyliodide and hexadecyl isonitrile is discarded. Fraction III is extracted with methyl ethyl ketone and the methyl ethyl ketone insoluble material is identified as a compound, melting over the range 229–231.5° C., after drying in a vacuum oven. Its composition is consistent with the calculated for the completely transalkylated product, cyanopenta-(hexadecylisonitrile) iron (II) iodide.

*Analysis.*—Calc. for $[CH_3(CH_2)_{14}CH_2NC]_5FeCNI$: C, 70.46; H, 11.36; N, 5.76; Fe, 3.81; I, 8.66. Found: C, 69.90; H, 10.97; N, 6.85; Fe. 3.82; I, 8.34; Br, 0.

From the extract, there is crystallized a yellow compound which, after several recrystallizations from methyl ethyl ketone, melts after drying over the range 90.5–93.0° C. This compound is a partially transalkylated product whose composition is consistent with that calculated for cyanotetra-(hexadecylisonitrile)-benzylisonitrile iron (II) iodide.

*Analysis.*—Calc. for

C, 69.44; H, 10.52; N, 6.31; Fe, 4.19; I, 9.53. Found: C, 68.94; H, 11.26; N, 6.10; Fe, 4.37; I, 8.34.

*Example V*

To 15.0 parts of cyanopentabenzylisonitrile iron (II) bromide is added 37.6 parts of 3-phenoxy-1-bromopropane and the reaction mixture is heated on a steam bath overnight in a reaction vessel closed by a calcium chloride drying tube. The reaction mixture is then dry distilled at 6–9 mm., the oil bath temperature being kept between 134 and 160° C. After 40 minutes, 8 parts by volume of a liquid boiling between 78 and 103° C. is distilled. The residue is dissolved in chloroform and chromatographed on a column over neutral alumina suspended in chloroform. The column is washed successively with chloroform, a mixture of 50% by volume chloroform-acetone, acetone, a mixture of 50% by volume acetone-methanol and methanol. Three fractions are eluted: fraction (I) with chloroform, (II) with 50% chloroform-acetone mixture and (III) with 50% acetone-methanol. The solvent is evaporated from fraction (II) and a deep yellow oil is obtained. The oil is dried for 60 hours at 25° C. and 1 mm. Analyses are consistent with those calculated for cyanopenta-(3-phenoxypropylisonitrile) iron (II) bromide.

*Analysis.*—Calc. for

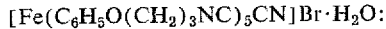

C, 62.13; H, 5.82; N, 8.53; Fe, 5.66; Br, 8.11. Found: C, 62.28; H, 6.10; N, 8.52; Fe, 6.19; Br, 8.00.

*Example VI*

To. 22.8 parts of cyanopentabenzylisonitrile iron (II) bromide is added 25 parts of p-nitrobenzyl bromide. The reactants are mixed well and dry-distilled at 9.0 mm. pressure and an oil-bath temperature of 125–141° C. The distillation is stopped after 30 minutes, during which distillate boiling over the range of 64–88° C. is collected. The distillate contains only benzyl bromide. The residue is dissolved in chloroform and chromatographed on neutral alumina suspended in chloroform. The column is washed successively with chloroform, a mixture of 50% by volume chloroform-acetone, acetone, a mixture of 50% by volume acetone-methanol and methanol. Three distinct fractions are isolated: fraction (I), 12.3 parts, is eluted with chloroform, (II), 13.7 parts, with 50% chloroform-acetone mixture, and (III), 19.9 parts, with the 50% acetone-methanol mixture. Compound (I) is identified as p-nitrobenzyl bromide. Compound (II) does not appear to be an isonitrile complex.

Compound (III) is recrystallized several times from methyl ethyl ketone and is dried. The dried crystals melt over the range 139–142° C. Analyses are consistent with those calculated from the partially transalkylated product, cyanotribenzylisonitrile di-(p-nitrobenzylisonitrile) iron (II) bromide.

*Analysis.*—Calc. for

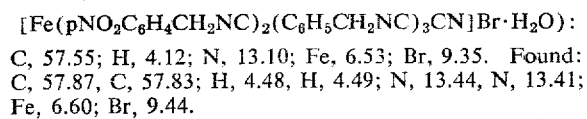

C, 57.55; H, 4.12; N, 13.10; Fe, 6.53; Br, 9.35. Found: C, 57.87, C, 57.83; H, 4.48, H, 4.49; N, 13.44, N, 13.41; Fe, 6.60; Br, 9.44.

A second partially transalkylated product is isolated from the mother liquor; it melts over the range 85–88° C.

*Example VII*

To 11.5 parts of p-methoxycarbonylbenzyl bromide is added 5.6 parts of tetrabenzylisonitrile iron (II) dicyanide. Tetrabenzylisonitrile iron (II) dicyanide is prepared by dry distillation of cyanopentabenzylisonitrile iron (II) bromide at 125° C. and 4 mm. pressure; the product is recrystallized from chloroform-carbon tetrachloride. The mixture is mixed well and is distilled under 5.0 mm. pressure at an oil-bath temperature of 135–162° C. The distillation is discontinued after about 3 parts of distillate, boiling between 78 and 80° C. is collected (after about 40 minutes). The distillate contains benzyl bromide and p-methoxycarbonylbenzyl bromide. The residue is dissolved in chloroform and chromatographed on neutral alumina. The column is washed successively with a mixture of 50% by volume acetone-chloroform acetone and a mixture of 50% by volume acetone-methanol. Two fractions are eluted—the first (I) with the acetone-methanol mixture.

Fraction I is recrystallized several times from methanol and from methyl ethyl ketone and dried. The compound melts over the range 226–230° C. The analyses are consistent with those calculated for the pentaisonitrile complex cyanobenzylisonitrile-tetra-(p-methoxycarbonylbenzylisonitrile) iron (II) bromide.

*Aanalysis.*—Calc. for

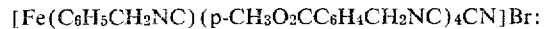

C, 60.07; H, 4.43; N, 8.58; Fe, 5.70; Br, 8.16. Found: C, 60.85; H, 5.39; N, 8.78; Fe, 5.21; Br, 8.54.

The product is probably contaminated with a small amount of the complex

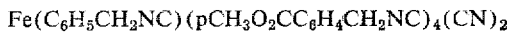

*Example VIII*

To 11.5 parts of tetrabenzylisonitrile iron (II) cyanide is added 20.5 parts of p-methylbenzyl bromide. The reactants are mixed well and dry distilled at 8 mm., maintaining the oil bath temperature at 125° C. The distillation is discontinued after about 8 parts by volume of a material boiling between 85–87° C. is collected. The distillate contains a mixture of benzyl bromide and p-methylbenzyl bromide. The residue is dissolved in chloroform and crystallized from chloroform-carbon tetrachloride. The white product is recrystallized several times from methyl ethyl ketone and dried. The product melts over the range 135–136.5° C. The compound is assigned the composition corresponding to cyanobenzylisonitriletetra-(p-methylbenzylisonitrile) iron (II) bromide.

*Analysis.*—Calc. for

[Fe(C₆H₅CH₂NC)(pCH₃C₆H₄CH₂NC)₄CN]Br:
C, 67.25; H, 5.39; N, 10.47; Fe, 6.96; Br, 9.95. Found: C, 66.42; H, 5.97; N, 11.23; Fe, 6.68; Br, 9.94.

Example IX

To a mixture containing 11.45 parts of p-methoxycarbonylbenzyl bromide and 6.05 parts of allyl bromide is added 15 parts of dry potassium ferrocyanide. The reaction mixture is heated on a steam bath with stirring in a vessel closed with a calcium chloride drying tube for two days. The reaction mixture is then extracted with petroleum ether, the insoluble residue is extracted with boiling chloroform, and the chloroform extracts are evaporated to dryness. The residue is pressed on a clay plate and then crystallized from carbon tetrachloride-chloroform. After several recrystallizations, the dried compound melts over the range 233–237° C. The material does not depress the melting point of cyano-penta-(p-methoxycarbonylbenzylisonitrile) iron (II) bromide prepared by an alternate route and the two infrared spectra are identical.

The transalkylation reactions of this invention appear to represent equilibrium situations, the nature of which are not necessarily favorable with respect to the transalkylated products. Therefore, conditions employed in the process are characteristic of those normally employed to shift equilibria. As might be expected, best results are obtained when the reactants are of such a nature that the eliminated halide is lower boiling than the alkylating agent and is continuously removed from the reaction vessel. Partially and completely transalkylated products are readily obtained under these conditions. The eliminated halide is distilled from the reaction mass until the calculated amount is removed, e.g., three equivalents of halide, if three of the isonitrile ligands are to be transalkylated, five equivalents for complete transalkylation, etc. Another technique applicable, especially when the eliminated halide is not lower boiling than the alkylating agent, is to employ a very large excess of the alkylating agent. After completion of the reaction, excess alkylating agent is removed normally by extraction with a solvent such as diethyl ether, petroleum ether, dioxane, etc., in which the products are insoluble. Having employed these conditions, the crude product usually comprises a mixture of partially and completely transalkylated complexes.

When complete transalkylation is desired, as has been discussed previously, the alkylating agent is represented by the formula

DE wherein D is defined as an alkyl radical containing at least six-chain carbon atoms, a substituted alkyl radical, other than methyl, free of carbon-to-carbon unsaturation at the alpha position or substituted methyl radicals having carbon-to-carbon unsaturation at the alpha position. Those alkyl groups bearing no substituents contain at least six-chain carbon atoms. Representative of this group are n-octyl, cetyl, n-decyl and the like. The substituted methyl radicals may be aromatic-substituted methyl radicals in which even the aromatic ring contains substituents, such as alkoxycarbonyl, alkoxy, alkyl, nitro groups and the like, as well as alkenyl-substituted methyl radicals. The substituted alkyl radicals, other than methyl, free of carbon-to-carbon unsaturation at the alpha position may include aryloxy-substituted alkyl groups, aroyl-substituted methyl groups, carboxy-substituted higher alkyl groups (six carbons) and the like. E represents bromide, chloride or iodide. Of course, aliphatic halides, which are not stable under the conditions of the transalkylation process, are ineffective. For example, in preference to transalkylation trityl bromide, cyclopentyl bromide, 2-hydroxyethyl bromide, epichlorohydrin and the like tend to form unsaturated derivatives by an elimination reaction which then undergoes polymerization. Isolation of any transalkylated products under these conditions is unlikely and impractical. As regards other cyanopentaisonitrile complexes, the bromide, chloride and iodide anions may be readily exchanged metathetically for other anions in accordance with the teachings of referenced copending application Serial No. 42,961.

Any cyanopentaisonitrile iron (II) complex described herein or in copending application Serial No. 42,961 may be employed as the starting material in the transalkylation process. It is apparent, however, that those with the greatest stability and having as ligands an isonitrile which transalkylates to eliminate a low boiling halide will be the most versatile and hence the most useful. Also useful, are tetraisonitrile complexes containing similar ligands. The tetraisonitrile complexes have formulas consistent with the general formula $$Fe(RNC)_4Z_2$$

wherein the R groups represent aliphatic isonitriles and Z denotes an anion. The tetraisonitrile complexes transalkylate to pentaisonitrile complexes of the types herein described at a very slow rate. The tetraisonitrile complexes are obtained by dry distillation of the cyanopentaisonitrile complexes.

Although the transalkylation reaction is usually carried out without added diluents or solvents, it may often be desirable to include inert liquids as reaction media. As a general rule, those solvents in which both of the reactants are soluble are most suitable. Solvents which have been found satisfactory are acetonitrile, benzonitrile, ethers, such as dimethyl ether of ethylene glycol and methyl ethyl ether, nitrobenzene, nitromethane, acetophenone and the like, although the final choice of solvent is dependent upon the nature of the starting materials.

A modification of the transalkylation process also within the scope of this invention utilizes the principle of transalkylation in conjunction with the alkylation of an alkali metal or tetra-substituted ammonium ferrocyanide with an activated alkylating agent. When a mixture of an activated alkylating agent and a transalkylating agent is employed in the ferrocyanide reaction, the alkylation of the ferrocyanide and the transalkylation of the complex thus formed can occur in the reaction mass simultaneously. For example, when a mixture of allyl bromide and p-methoxycarbonylbenzyl bromide, each in stoichiometric quantities, are reacted with potassium ferrocyanide, cyanopenta-(p-methoxycarbonylisonitrile) iron (II) bromide is isolated in good yield. It is known from rate studies that allyl bromide reacts much more rapidly with potassium ferrocyanide than does p-methoxycarbonylbenzyl bromide. Studies of this reaction confirm that the pentaallyl complex forms first and that this transalkylates preferentially with the p-methoxycarbonylbenzyl bromide also present in the reaction mixture to produce the penta-(p-methoxycarbonylbenzylisonitrile) as the final product.

The process described herein is useful for the preparation of cyanopentaisonitrile iron (II) complexes, and has the special advantage of making possible the preparation of iron-pentaisonitrile complexes otherwise not obtainable or obtainable only with difficulty or in low yield by the direct alkylation of alkali metal or tetra-substituted ammonium ferrocyanides with an activated alkylating agent as described in copending application Serial No. 42,961. Provided by this process, therefore, are iron pentaisonitrile complexes containing as ligands non-activated higher-alkyl isonitriles, such as cetyl isonitrile; isonitriles containing negative substituents, such as p-nitrobenzylisonitrile; those containing strongly acidic groups; complexes containing more than one kind of isonitrile; etc.

The cyanopentaisonitrile iron (II) complexes are useful intermediates in the production of a number of organic compounds; for example, for the preparation of ethers and for the preparation of organic isonitriles. When a solution of a pentaisonitrile iron (II) complex is pressurized with nitrogen in an alcohol and heated, ethers are obtained in good yield. Organic isonitriles are obtained by the reaction of the pentaisonitrile complexes with cyanide.

The forms of the invention herein disclosed are to be regarded as being by way of example. It will be apparent to those skilled in the art that numerous modifications may be made therein without departure from the spirit of the invention or the scope of the appended claims.

What is claimed is:

1. A composition of matter of the general formula $$[Fe(RNC)_{5-y}(DNC)_y CN]E$$

wherein D is a radical selected from the group consisting of alkyl and a substituted alkyl, E is an anion selected from the group consisting of bromide, chloride and iodide, R is a radical selected from the group consisting of alkyl and substituted alkyl and y is a number from 1–5 with the proviso that when y is 5, D is a member selected from the group consisting of alkyl radicals containing at least six-chain carbon atoms and substituted alkyl radicals free of carbon-to-carbon unsaturation at the alpha position.

2. The composition of claim 1 wherein y is 5 and D is an alkyl radical containing at least six-chain carbon atoms.

3. The composition of claim 1 wherein D is a substituted alkyl radical free of carbon-to-carbon unsaturation at the alpha position and y is 5.

4. The composition of claim 1 wherein R is benzyl and y is a number from 1–4.

5. The composition of claim 4 wherein D is methoxycarbonylbenzyl.

6. The composition of claim 4 wherein D is hexadecyl.

7. The composition of claim 4 wherein D is nitrobenzyl.

8. The composition of claim 4 wherein D is methylbenzyl.

9. A process for preparing cyanopentaisonitrile iron (II) complexes of the general formula $$[Fe(DNC)_5 CN]E$$

which comprises transalkylating a cyanopentaisonitrile iron (II) salt selected from the group consisting of (I) cyanopenta-(alkyl and substituted-alkylisonitrile)-iron (II) chloride, bromide and iodide, with an alkylating agent of the formula

DE wherein D is a member selected from the group consisting of alkyl radicals containing at least six-chain carbon atoms, substituted alkyl radicals, other than methyl, free of carbon-to-carbon unsaturation at the alpha position and substituted methyl radicals having carbon-to-carbon unsaturation at the alpha position, and E is an anion selected from the group consisting of bromide, chloride and iodide, at an elevated temperature.

10. The process of claim 9 wherein the said iron (II) salt is cyanopentabenzylisonitrile iron (II) bromide and D is selected from the group consisting of alkyl radicals having at least six-chain carbon atoms.

11. The process of claim 9 wherein the said iron (II) salt is cyanopentabenzylisonitrile iron (II) bromide and D is selected from the group consisting of substituted alkyl radicals free of carbon-to-carbon unsaturation at the alpha position.

12. The process of claim 9 wherein D is selected from the group consisting of substituted methyl radicals having carbon-to-carbon unsaturation at the alpha position.

13. A process for the preparation of iron pentaisonitrile complexes of the general formula $$[Fe(RNC)_{5-y}(DNC)_y CN]E$$

wherein R is a radical selected from the group consisting of alkyl and substituted alkyl and y is a number from 1–4 which comprises transalkylating a cyanopentaisonitrile iron (II) salt selected from the group consisting of (I) cyanopenta-(alkyl and substituted-alkylisonitrile)-iron (II) chloride, bromide and iodide, with an alkylating agent of the formula

DE wherein D is a member selected from the group consisting of alkyl and substituted alkyl radicals and E is an anion selected from the group consisting of bromide, chloride and iodide, at an elevated temperature.

14. The process of claim 13 wherein the said iron (II) salt is cyanopentabenzylisonitrile iron (II) bromide and D is an alkyl radical.

15. The process of claim 14 wherein D is the hexadecyl radical.

16. The process of claim 13 wherein the said iron (II) salt is cyanopentabenzylisonitrile and D is a substituted alkyl radical.

17. The process of claim 16 wherein D is the methoxycarbonylbenzyl radical.

18. The process of claim 16 wherein D is the nitrobenzyl radical.

References Cited in the file of this patent

Progress in Inorganic Chemistry, vol. 1, pp. 320–332 (1959).

UNITED STATES PATENT OFFICE
CERTIFICATE OF CORRECTION

Patent No. 3,085,103                      April 9, 1963

Walter Zygfried Heldt

It is hereby certified that error appears in the above numbered patent requiring correction and that the said Letters Patent should read as corrected below.

Column 10, line 40, before "and" insert -- iron (II) bromide --.

Signed and sealed this 22nd day of October 1963.

(SEAL)
Attest:

ERNEST W. SWIDER
Attesting Officer

EDWIN L. REYNOLDS
Acting Commissioner of Patents